US010917456B2

(12) United States Patent
Parees et al.

(10) Patent No.: US 10,917,456 B2
(45) Date of Patent: Feb. 9, 2021

(54) APPLICATION MANAGEMENT IN AN APPLICATION DEPLOYMENT PIPELINE

(71) Applicant: Red Hat, Inc., Raleigh, NC (US)

(72) Inventors: Benjamin Parees, Durham, NC (US); Daniel McPherson, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 310 days.

(21) Appl. No.: 15/218,269

(22) Filed: Jul. 25, 2016

(65) Prior Publication Data

US 2018/0027051 A1    Jan. 25, 2018

(51) Int. Cl.
| G06F 15/16 | (2006.01) |
| H04L 29/08 | (2006.01) |
| G06F 8/71 | (2018.01) |
| H04L 12/24 | (2006.01) |

(52) U.S. Cl.
CPC .............. *H04L 67/10* (2013.01); *G06F 8/71* (2013.01); *H04L 67/34* (2013.01); *H04L 41/0816* (2013.01); *H04L 41/0893* (2013.01)

(58) Field of Classification Search
CPC ... H04L 41/0816; H04L 41/082; H04L 47/70; H04L 67/10; H04L 67/16; H04L 41/0803; H04L 41/12; H04L 63/105; H04L 67/34; H04L 41/0893; H04L 41/147; H04L 41/0896; H04L 41/16; H04L 43/067; H04L 43/0876; H04L 43/16; G06F 8/71
USPC ........................................................ 709/217
See application file for complete search history.

(56) References Cited

U.S. PATENT DOCUMENTS

| 6,473,794 | B1 * | 10/2002 | Guheen | H04L 41/22 |
| | | | | 709/223 |
| 7,860,961 | B1 * | 12/2010 | Finkelstein | H04L 12/4641 |
| | | | | 709/223 |
| 7,886,041 | B2 * | 2/2011 | Outhred | H04L 67/1002 |
| | | | | 709/224 |

(Continued)

OTHER PUBLICATIONS

Oracle®, 3 Ways to Move Application Development to the Cloud, 2013, Link: http://www.oracle.com/us/solutions/cloud/application-development-cloud-1945542.pdf (5 pages).

(Continued)

*Primary Examiner* — Anthony Mejia
(74) *Attorney, Agent, or Firm* — K&L Gates LLP

(57) ABSTRACT

The present disclosure provides new methods and systems for managing applications in a deployment pipeline. For example, a policy of a first environment and a policy of a second environment are detected. A request to move an application from the first environment to the second environment is received. Configuration data of the first environment is incompatible with the second environment. A configuration data set associated with the application is detected and includes various pieces of configuration data. Based on the various policies and the configuration data set, actions to be implemented in the configuration data set are determined, including actions associated with each piece of configuration data. The actions are implemented on the pieces of configuration data to obtain a reconfigured configuration data set that includes different configuration data than that of the first environment. The application and the reconfigured configuration data set are moved to the second environment.

20 Claims, 5 Drawing Sheets

(56) References Cited

U.S. PATENT DOCUMENTS

| | | | |
|---|---|---|---|
| 8,572,547 B1 | 10/2013 | Urh et al. | |
| 8,719,782 B2 | 5/2014 | DeHaan | |
| 8,875,118 B1 | 10/2014 | Groothius et al. | |
| 8,959,222 B2* | 2/2015 | Arrowood | H04L 67/1002 |
| | | | 709/226 |
| 9,116,768 B1* | 8/2015 | Sawhney | G06F 8/60 |
| 9,729,579 B1* | 8/2017 | Marino | H04L 63/20 |
| 9,992,064 B1* | 6/2018 | Chawla | H04L 41/082 |
| 10,275,258 B2* | 4/2019 | Zellermayer | G06F 9/4843 |
| 2005/0080811 A1 | 4/2005 | Speeter et al. | |
| 2007/0043860 A1* | 2/2007 | Pabari | G06F 9/455 |
| | | | 709/224 |
| 2012/0089726 A1* | 4/2012 | Doddavula | G06F 9/5072 |
| | | | 709/224 |
| 2013/0232245 A1* | 9/2013 | Antosz | G06F 8/10 |
| | | | 709/222 |
| 2013/0268920 A1 | 10/2013 | Ursal et al. | |
| 2014/0282400 A1 | 9/2014 | Moorthi et al. | |
| 2014/0359261 A1 | 12/2014 | Collins et al. | |

OTHER PUBLICATIONS

Viswanathan, Karthick, Docker from Development to Deployment, Customer Success—WaveMakerOnline, Jun. 29, 2015, Link: http://www.wavemaker.com/docker/docker-from-development-to-deployment/ (4 pages).

Managing Multiple Environments for an App, Feb. 12, 2016, Link: https://devcenter.heroku.com/articles/multiple-environments (5 pages).

* cited by examiner

APPLICATION MANAGEMENT IN AN APPLICATION DEPLOYMENT PIPELINE

BACKGROUND

The present disclosure relates generally to the management of an application in a deployment pipeline. An application deployment pipeline may include two or more environments which may play a role in the development of an application. Application deployers need to move their applications between environments using an application deployment pipeline. Various different environments may be separately maintained to ensure changes to applications can be tested in a safe environment before they are made available to end users on a production system.

SUMMARY

The present disclosure provides new and innovative methods and systems for managing an application in a deployment pipeline. For example, in a method for managing an application deployment pipeline, the application deployment pipeline may detect a first policy associated with a first environment and may detect a second policy associated with a second environment. The application deployment pipeline may receive a request to move an application from the first environment to the second environment. Configuration data of the first environment may be incompatible with configuration data of the second environment. The application deployment pipeline may detect a configuration data set associated with the application. The configuration data set may include a first piece of configuration data and a second piece of configuration data. The application deployment pipeline may determine actions to be implemented in the configuration data set based on the first policy, the second policy, and the configuration data set, including a first action associated with the first piece of configuration data and a second action associated with the second piece of configuration data. The application deployment pipeline may implement the first action on the first piece of configuration data and the second action on the second piece of configuration data to obtain a reconfigured configuration data set that includes different configuration data than the configuration data of the first environment. The application deployment pipeline may move the application, including the reconfigured configuration data set, to the second environment.

Additional features and advantages of the disclosed method and apparatus are described in, and will be apparent from, the following Detailed Description and the Figures.

DETAILED DESCRIPTION

Each environment in an application deployment pipeline may have policies that dictate how an application enters an environment, what configuration data may be carried into the environment, and additional information that further defines the behavior of an application within the environment. Furthermore, each application may include configuration data that may control runtime aspects of how the application operates. The configuration data of one environment may not be applicable to a second environment.

Typically, application developers define the process of moving their applications between environments and manually configure which information is to be carried between environments. In addition, some information may typically be configured uniquely for each environment. For example, an application may require a database password, which is different in each environment and additional information, such as a version of a database driver, which typically is the same in each environment. The process of manually configuring this information is typically repeated for each application that is moved between environments in an application deployment pipeline. Manual configuration carries a high risk of errors, which may result in incorrect information being promoted between environments or the application inappropriately being promoted to an environment. Typically an application may continue moving for as long as the application is in use. The manual configuration process may be continuously ongoing.

Different environments in the application deployment pipeline may have different environment policies. Applications in the application deployment pipeline may have different configuration data. By automatically detecting this information, the present disclosure allows applications to be moved between environments while following the system policies without manual configuration when moving each individual application in the application deployment pipeline. The policies of the a first environment, the policies of a second environment, and the configuration data of an application provide the information needed to modify the configuration data to run the application in each environment as disclosed herein. By combining a set of defined environment policies with defined application configuration data, the present disclosure may allow for automatically promoting applications between environments while enforcing approval requirements, test cases, and ensuring the integrity of the configuration data, for example, while also preventing private credentials from being transferred between environments.

Metadata of an application may include configuration data about how to move an application or components of an application. The metadata may be included in the application, and move with the application as the application moves between environments.

Figure 1:
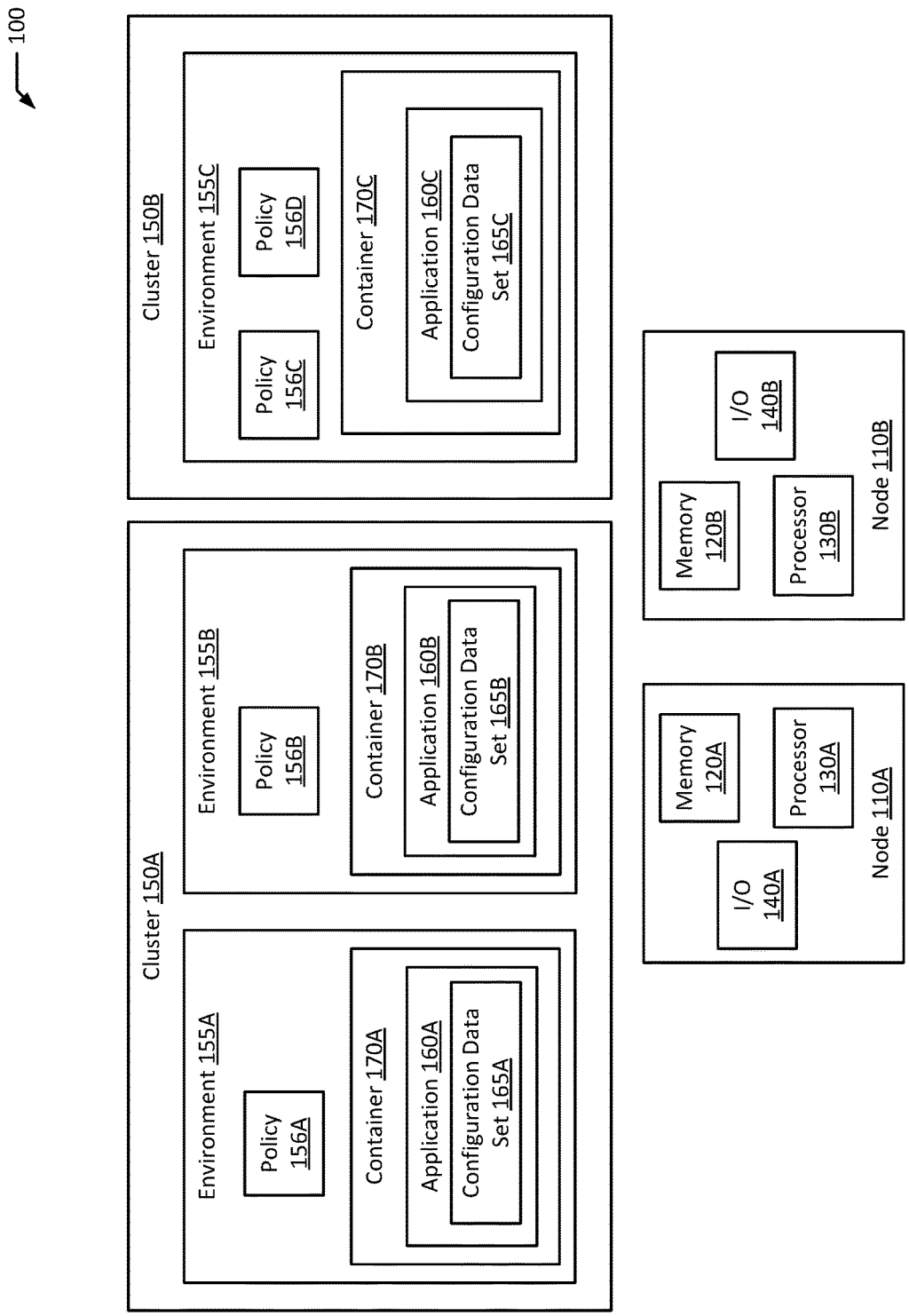
FIG. 1 is a block diagram of an application deployment pipeline system according to an example of the present disclosure.

FIG. 1 depicts a high level component diagram of an example multi-environment application deployment system 100. The deployment system 100 may include one or more interconnected nodes 110A-B. Each node 110A-B may include one or more physical processors 130A-B communicatively coupled to memory devices 120A-B and input/output devices (e.g., I/O 140A-B). Each node 110A-B may include a hardware device, for example a network device (e.g., a network interface controller (NIC), a network adapter, or any other component that connects a computer to a computer network), a peripheral component interconnect (PCI) device, storage devices, sound or video adaptors, photo/video cameras, printer devices, keyboards, displays, graphics cards etc. The hardware device may be communicatively coupled to a memory device.

As used herein, physical processor or processor 120A-B refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory 130A-B refers to a volatile or non-volatile memory device, such as RAM, ROM, EEPROM, or any other device capable of storing data. As discussed herein, I/O device 140A-B refers to a device capable of providing an interface between one or more processor pins and an external device, the operation of which is based on the processor inputting and/or outputting binary data.

Processors 130A-B may be interconnected using a variety of techniques, ranging from a point-to-point processor interconnect, to a system area network, such as an Ethernet-based network. Local connections within each node 110A-B, including the connections between a processor 120A and a memory device 130A and between a processor 120A and an I/O device 140A may be provided by one or more local buses of suitable architecture, for example, peripheral component interconnect (PCI).

For example, the deployment system 100 may include a cluster 150A and a cluster 150B. Cluster 150A and cluster 150B may run in part on both nodes 110A and 110B. Cluster 150A may include environment 155A and environment 155B located within cluster 150A. Environment 155C may be located within cluster 150B. As described herein, one or more clusters 150A-B may be generically referred to as clusters 150 when not referring to any specific cluster 150. Likewise, one or more environments 155A-C may be generically referred to as environments 155 when not referring to any specific environment 155. In another example, cluster 150A may run on node 110A and cluster 150B may run on node 110B. Alternatively, clusters 150A-B may run on the same node 110A. The nodes 110A-B may be in same geographical location or the nodes 110A-B may be located at different geographical locations. In an example, environment 155 may be located across two or more clusters 150. A cluster 150 may execute a kernel that controls all computing operations on the cluster 150.

Environment 155A may have a policy 156A, environment 155B may have a policy 156B, and environment 155C may have policies 156C and 156D. Each of the policies 156A-D is specifically defined for its respective environment (e.g., policy 156A is specifically defined for environment 155A, policy 156B is specifically defined for environment 155B, and policies 156C and 156D are specifically defined for environment 155C). The policies 156A-D may define how an application 160A-C enters an environment 155 as well as what configuration data should be carried into the new environment 155 as the application 160A-C moves in the deployment system 100.

Environment 155A may include container 170A. Container 170A may share the kernel of cluster 155A. Container 170A may include application 160A, and application 160A may include a configuration data set 165A. Configuration data set 165A may include one or more pieces of configuration data. The configuration data set 165A, and the configuration data therein, may control runtime aspects of how the application 160A will work in various environments. The configuration data set 165A of one environment 155A may not be compatible with another environment 155C. Accordingly, the configuration data set 165A may need to be changed as the application 160A moves between environments 155 in the application deployment system 100.

Similar to environment 155A, environment 155B may include container 170B. Container 170B may also share the kernel of cluster 155A. Container 170B may include application 160B or container 170B may include one or more components of application 160B. Application 160B may include configuration data set 165B. Configuration data set 165B may also include one or more pieces of configuration data. The configuration data set 165B, and the configuration data therein, may control runtime aspects of how the application 160B will work in various environments 155 in the application deployment system 100.

Environment 155C may include container 170C. Container 170C may shares the kernel of cluster 150B. Container 170C may include application 160C, or one or more components of application 160C. Application 160C may include configuration data set 165C. Configuration data set 165C may also include one or more pieces of configuration data. The configuration data set 165C, and the configuration data therein, may control runtime aspects of how the application 160C will work in various environments 155 in the application deployment system 100.

A cluster 150 may include multiple containers 170. A cluster 150 may include one container 170. Two clusters 150 may include separate parts of a single container 170. Containers 170A and 170B share a kernel of the cluster 150A that the containers 170A and 170B are located in. As described herein, one or more containers 170A-B may be generically referred to as containers 170 when not referring to any specific container 170. Likewise, one or more applications 160A-C may be referred to as applications 160 when not referring to any specific application 160. The shared kernel may allow a container 170 to be launched on-demand, without operating system boot time or additional lag. Containers 170 may share the kernel(s) of the clusters 150 that the containers 170 are located in. Typically a cluster 150 may be located on two nodes 110A and 110B. A container 170 located in a cluster 150 that is located on more than one node 110A and 110B may have access to the kernels of both node 110A and of node 110B. Each container 170 may contain one or more components of an application or the entirety of an application 160.

Figure 2:
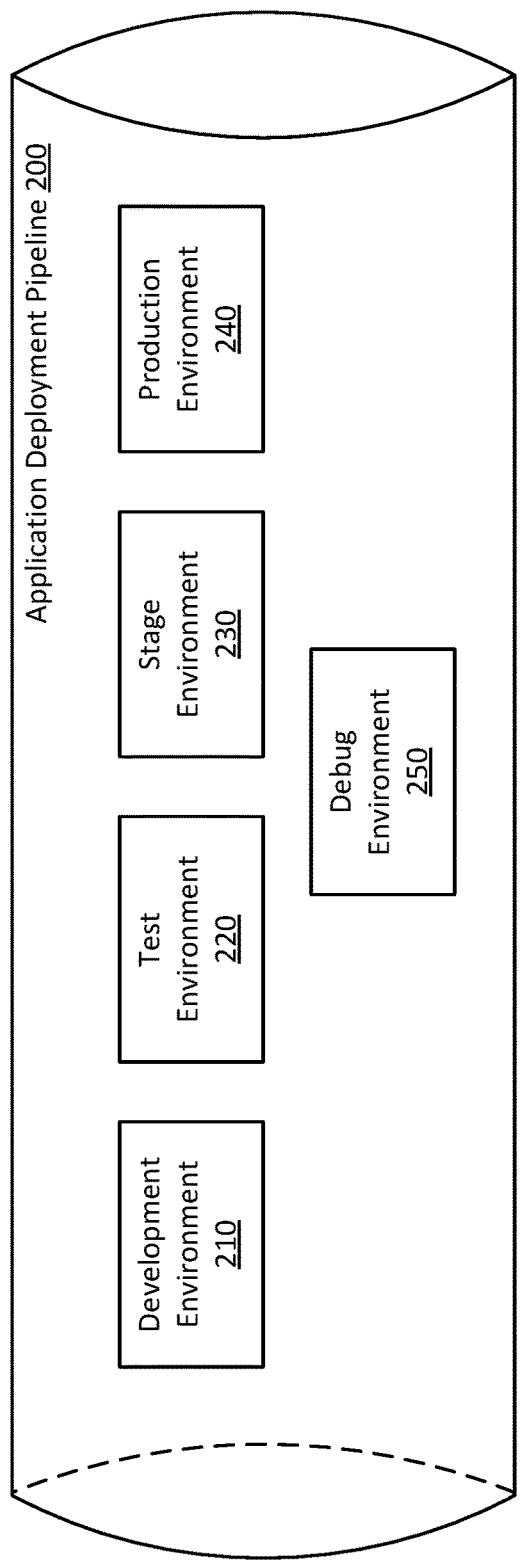
FIG. 2 is a block diagram of an application deployment pipeline according to an example of the present disclosure.

FIG. 2 is a block diagram of an application deployment pipeline system 200 according to an example of the present disclosure. FIG. 2 depicts example environments that may exist within an application deployment pipeline 200. An application deployment pipeline 200 may include a development environment 210, a test environment 220, a stage environment 230, a production environment 240, and a debug environment 250. For example, the application deployment pipeline 200 may be a continuous integration and/or continuous delivery ("CI/CD") pipeline. For another example, the application deployment pipeline 200 may be a continuous deployment pipeline. The application deployment pipeline 200 may be in a PaaS environment.

A development environment 210 may be an environment 155 where changes are made to an application 160 that is under development. The development environment 210 may include the tools needed to develop an application 160 such as a code editor, a compiler, a library, etc.

A test environment 220 may be an environment 155 where an application 160, or an application component, undergoes real world test scenarios to replicate use and ensure that the application 160, or application component, can support the use. A test environment 220 may include test files, test data and test users.

A stage environment 230 may be a pre-production environment 155 where an application 160 undergoes final testing prior to production. In the stage environment 230, an application 160 may connect to production services and data, replicated production services and data, or stage services and data. The application 160 may connect to any combination of the production services and data, the replicated production services and data, and the stage services and data. In the stage environment 230, the application 160 may have all application components tested together, including installation scripts and procedures. The stage environment 230 may include load testing and stress testing of the application 160 to ensure the application 160 can run in the production environment 240.

A production environment 240 may be the environment 155 in which a user interacts with an application 160. In the production environment 240, an application 160 may have access to production services and production data. The production environment 240 may be located on a user's device. The production environment 240 may be located on a node.

A debug environment 250 may be the environment 155 in which an application 160 is analyzed to discover and fix bugs that may exist in the application 160. For example, a debug environment 250 may have a policy that would copy all data related to an issue to be debugged into the debug environment 250 but the policy may regenerate all passwords that were used in the previous environment 155A.

Additional environments 155 may exist in the application deployment pipeline 200, and an application 160 need not progress through each environment 155 in the application deployment pipeline 200. For example, an application 160 may skip one or more environments 155. Also different components of an application 160 may exist in one or more environments 155 at the same time. Multiple applications 160 may exist in one environment 155 at the same time.

Figure 3:
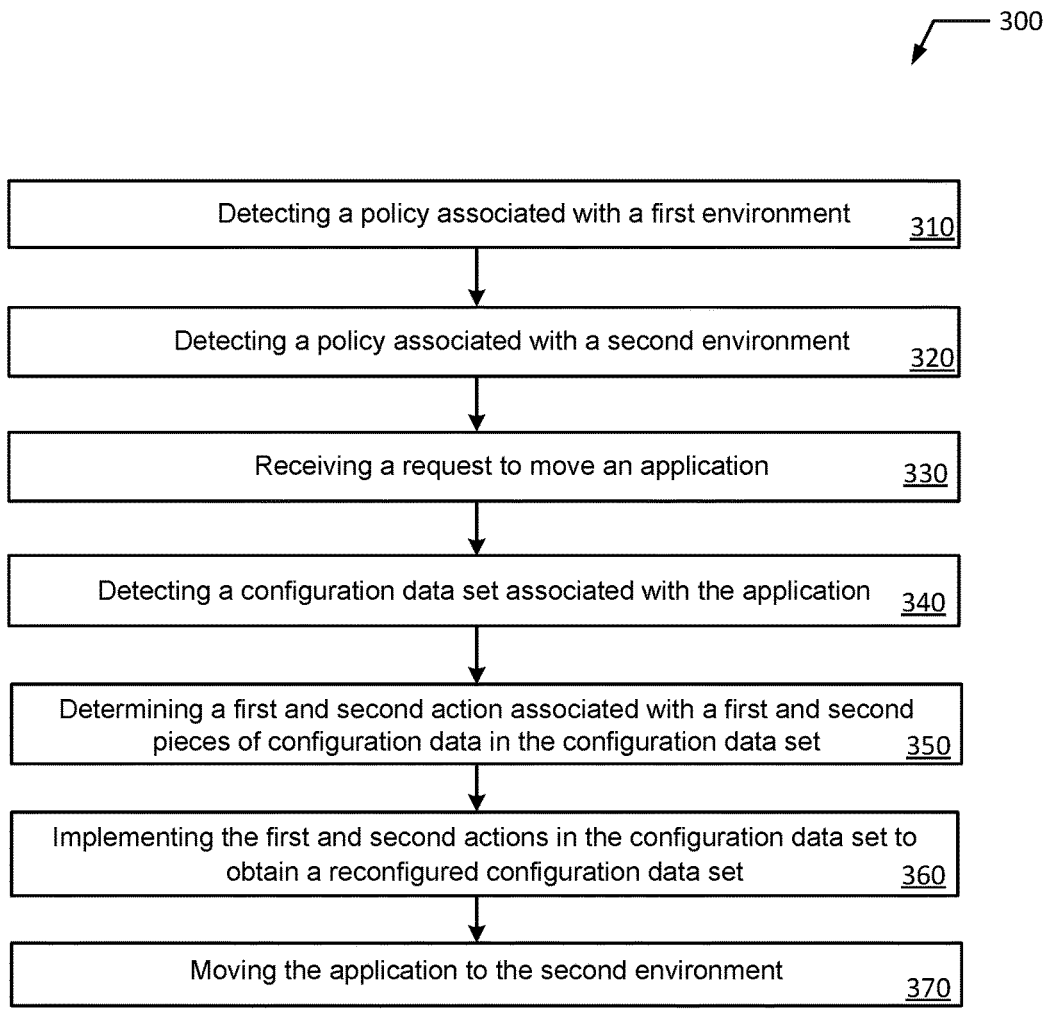
FIG. 3 is a flowchart illustrating an example method for managing an application deployment pipeline according to an example of the present disclosure.

FIG. 3 is a flowchart illustrating an example method for managing an application deployment pipeline according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. In an example, the method 300 may be performed by processing logic that may comprise hardware (circuitry, dedicated logic, etc.), software, or a combination of both.

The example method 300 starts with detecting a first policy associated with a first environment (block 310). In an example, the first policy 156A may be that deployment must be validated before the application 160A may leave the first environment 155A. In an example, the detection of the first policy 156A may be initiated by a trigger event. The trigger event may be, for example, a user command that is received via an input/output device 140A, a specific time or date that has been defined in the application deployment pipeline 200, the completion of a task or set of tasks within an environment 155, or a request from an administrator of the application deployment pipeline 200. The first policy 156A may dictate how an application 160 is to enter an environment 155 and may define what configuration data of the configuration data set is needed in the environment 155. Examples of a policy 156A-D may be whether manual approval is needed to enter an environment 155C, whether to run unit tests associated with an application 160, whether to run an end to end test associated with an application 160, whether to validate the deployment, how to handle configuration data from the previous environment 155A, and resource limits and minimum scaling limits for the environment 155C. The policies 156A-D may be defined in each environment 155.

A second policy associated with a second environment may be detected (block 320). For example, the second policy 156C may be a minimum scaling limit for the environment 155C. The second policy 156C may allow for five replicas or instances of the application 160A to be deployed in the second environment 155C.

A request to move an application from the first environment to the second environment may be received (block 330). The configuration data of the first environment 155A may be incompatible with configuration data of the second environment 155C. For example, multiple pieces of configuration data, such as passwords, processing requirements, and database access may be incompatible between environments 155A and 155C. For example, the database used in a first environment 155A may include test data, and the database used in a second environment 155C may include live or real world data. The request to move the application 160A may be an automatic request generated at a specific time or date, at the conclusion of a task or series of tasks in an environment, or the request may be a user initiated request. The configuration data set 165A may typically include many pieces of configuration data. The one or more pieces of configuration data may typically be a configuration data set 165A.

A configuration data set associated with the application may be detected (block 340). For example, the configuration data set 165A may include a first piece of configuration data (e.g., a persistent volume definition) and a second piece of configuration data (e.g., a deployment hook). The configuration data in the configuration data set 165A of the application 160A may be defined as part of the application 160A when the application 160A is developed. As described herein, one or more configuration data sets 165A-C may be generically referred to as configuration data sets 165 when not referring to any specific configuration data set 165. In an example, a configuration data set (e.g., 165A) associated with an application (e.g., 160A) may be specific to the application (e.g., 160A) in a first environment (e.g 155A). Alternatively, the configuration data set 165 may be a canonical configuration data set that is generic, rather than specific to any one environment 155. A configuration data set 165 may be defined for an application 160 in each respective environment 155 or the configuration data set 165 may be partially defined in each environment 155. A configuration data set 165 that is partially defined in an environment 155 may have configuration data that is defined in the environment 155 and other configuration data that is not defined in the environment 155. If the configuration data set 165 is partially defined in an environment 155, the undefined pieces of configuration data that make up the configuration data set 165 may need to be generated for a different environment 155 in which the application 160 might be executed. When the configuration data set 165 is defined in the application 160, the application 160 may be automatically moved between environments 155 within the application deployment system 200. Configuration data may include persistent volume definitions, secret credentials, environment variables, resource limits, minimum system requirements, replica counts, deployment hooks, and test case definitions.

Persistent volume definitions may define where and how data is stored. Persistent volume definitions may point to a file system located in a cloud or to file systems located locally within an environment 155, for example within the test environment 220. For example, the persistent volume definition may ensure that file system data is available as an application 160 moves from one machine to another machine or from one environment 155A to a second environment 155C.

Secret credentials may be a password, certificate, token, and/or files. A secret credential may be data that should not be included as part of an application 160, but that the application 160 may need to access. For example, a password may be made of ascii characters from length 8-12 and the password may be used to access a set of test data in a test environment 220. However, in the same example, the password may not be useful in a production environment 240 where a live data set is protected by a different password. The password in the test environment 220 will need to be regenerated in the production environment 240. Additionally, passwords in the production environment 240 may not be shared with other environments 155 to ensure that the credentials are not leaked between environments 155. Regenerating a secret credential in a new environment 155C may ensure that data is not inadvertently shared between environments 155A and 155C as the application 160A moves between environments 155A and 155C.

Environment variables may control application 160 behavior in an environment 155 or provide configuration information. For example, environment variables may specify a version of a framework to be used. For example, the environment variables may specify Java 1.8, Ruby 2.2, or the like and the specified version may be carried from a first environment 155A to a second environment 155C. The application 160 may use the environment variables to trigger its behavior in a given environment 155. Additional examples of environment variables may include memory heap size, a url to connect to a database of information, a path to a file system directory to be used, etc. The environment variables may be defined as categories of environment variables (e.g., passwords, versions). A policy 156B may be written around an environment variable. For example, a second policy 156B may specifically be written to regenerate a password in a second environment 155B. In another example, a first policy 156A may be specifically written to copy a version from the first environment 155A. An environment variable may include an option that may set a preference for the environment variable as to how the environment variable is moved from a first environment to a second environment. In an example, a first policy 156A may override an environment variable preference, while a second policy 156B may not override an environment variable preference.

Resource limits may dictate the upper bounds of resources that an application 160 may use. For example, resource limits may dictate how much memory may be devoted to an application 160, an upper bound on processing requirements to prevent overuse of a processor, maximum storage allowances for an application 160, limits on disk I/O, network I/O, etc. Such resource limits may ensure that an application 160 is tested accurately based on its proposed user platform. For example, an application 160A may be designed for a cellular communication device with limited storage capacity and be tested in a test environment 220 with similar storage capacity allotted to the application 160A. A resource limit may be used as a scheduling requirement in the application deployment pipeline 200 to ensure that the application deployment pipeline 200 can handle the maximum requirement of the application 160 during various points in the application deployment pipeline 200.

Minimum system requirements may dictate the lower bound of resources that an application 160 requires for operation. For example, a minimum amount of memory the application 160 needs, a lower bound on processing requirements, a minimum storage allowance for the application 160 and requirements of disk I/O. Such minimum system requirements may ensure that the application 160 is tested accurately based on its proposed user platform. For example, an application 160A may designed for a desktop computing device with enhanced processing capabilities and the application 160A may be tested in a test environment 220 with similar processing requirements to ensure accurate testing. A minimum system requirement may ensure that the test environment 220 can support the application 160A.

Replica counts may determine how many copies of an application 160 are to be run in each environment 155. The replica count may include an upper and lower bound of copies to run in an environment 155. Alternatively, the replica count may define a specific number of copies to run in an environment 155. Also, the replica count may be based on traffic needs in the application deployment pipeline 200. For example, a replica count may define that twelve copies of application 160C are run in a test environment 220.

Deployment hooks may provide for specific actions to take place as the application 160 is deployed. For example, an application 160A may need to load a database or initialize a database before the application 160A can run in an environment 155C. The deployment hooks can be modified for each environment 155, allowing the deployment hooks to be different in each environment 155 instead of coding the deployment hooks into the application 160.

Test case definitions may be used to validate an application 160 in an environment 155. Test case definitions may run unit tests, integration tests, and end to end tests. The tests may be dependent upon the programming language of the application 160.

Based on the first policy of the first environment, the second policy of the second environment, and the configuration data set, actions are automatically determined to be implemented in the configuration data set 165A (block 350). These actions may include a first action associated with the first piece of configuration data and a second action associated with the second piece of configuration data. The actions may include copying the configuration data, regenerating the configuration data or generating the configuration data.

The first action is implemented on the first piece of configuration data and the second action is implemented on the second piece of configuration data to obtain a reconfigured configuration data set that includes different configuration data than the configuration data of the first environment (block 360). The application deployment pipeline may copy a first piece of configuration data. The copy of the configuration data may be a replica of the configuration data in the second environment 155C. The application deployment pipeline may regenerate a first piece of configuration data. Configuration data may be regenerated when the configuration data existed in the first environment 155A, but that piece of configuration data may not be compatible with the second environment 155C. The application deployment pipeline may generate a first piece of configuration data. The configuration data may be generated if the configuration data was a null value or did not exist in the first environment 155A. The first piece of configuration data may be part of a configuration data set 165. In an example, the first and second pieces of configuration data may have previously been reconfigured for the first environment 155A. Alternatively, in another example, the first and second pieces of configuration data may be part of a canonical configuration data set. The reconfigured configuration data set may also be referred to as a mutated configuration data set. The reconfigured configuration data set may include configuration data specific to allow an application 160 to run in an environment 155. The reconfigured configuration data set may be mutated from the configuration data that was defined in the application 160. The reconfigured configuration data set may be mutated from already mutated configuration data in an environment 155.

The application deployment pipeline may move the application, including the reconfigured configuration data set, to the second environment (block 370). For example, the application 160A, is moved or copied into the second environment 155C, and the defined configuration data and mutated or reconfigured configuration data is also moved or copied into the second environment 155C.

At some point, the application deployment pipeline 200 may need to move the application 160 to a third environment 155. The third environment 155 may exist in the same cluster as the second environment 155 or the third environment 155 may exist in a different cluster 150 than the second environment 155. Also, the third environment 155 may exist partially in the same cluster 150 as the second environment 155. For example, an application 160 may be moved from a second environment 155C to a third environment 155B. The detected configuration data set 165 for the move of application 160 from the second environment 155C to the third environment 155B may be the reconfigured configuration data set of the application 160 as the application 160 exists in the second environment 155B. Alternatively, the detected configuration data set 165 for the move from the second environment 155C to the third environment 155B may be a canonical configuration data set that is associated with the application 160, but is not specific to any particular environment 155.

Figure 4:
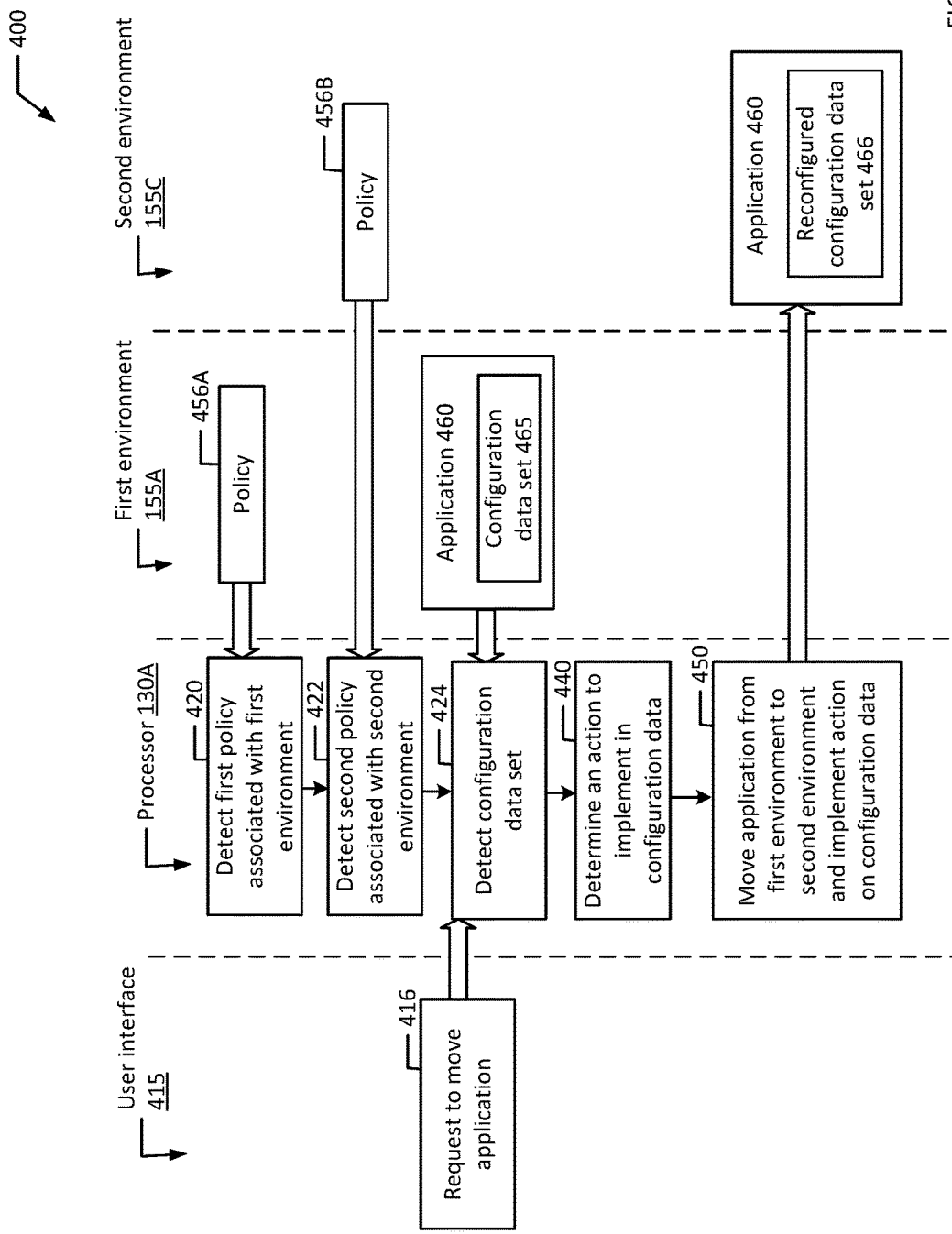
FIG. 4 is a flow diagram illustrating an example method for managing an application deployment pipeline according to an example of the present disclosure.

FIG. 4 illustrates an example method for managing an application deployment pipeline according to an example of the present disclosure. The example method 400 includes moving data between a user interface 415, a processor 130A, a first environment 155A and a second environment 155C. Although the example method 400 is described with reference to the flow diagram illustrated in FIG. 4, it will be appreciated that many other methods of performing the acts associated with the method 400 may be used. For example, the order of some of the blocks may be changed, certain blocks may be combined with other blocks and some of the blocks described are optional. The method 400 may be performed by processing logic that may comprise hardware (circuitry, dedicated logic, etc.), software, or a combination of both.

In example method 400, the application 460 is moved from the first environment 155A to the second environment 155C. A processor 130A may detect a first policy 456A that is associated with the first environment 155A (block 420). For example, the first policy 456A may indicate that an end-to-end test should be run before the application 460 may be moved from the first environment 155A. The processor 130A may wait until the end-to-end test is successfully completed before moving the application 160A.

The processor 130A may detect a second policy 456B associated with a second environment 155C (block 422). For example, the second policy 456B may indicate that configuration data from the previous environment 155A should be regenerated in the second environment 155C. The first environment 155A may be a test environment 220 and the second environment 155C may be a stage environment 230. The configuration data set 465 of the first environment 155A may not be compatible with the second environment 155C. For example, in the test environment 220, the application 460 may be using a test database, however in the stage environment 230, the application 460 may be using a production database to ensure full compatibility when the application 460 is moved to the production environment 240. Accordingly, the passwords to access the database may need to be regenerated in the second environment 155C.

In an example where a policy 456B relates to database contents, the policy 456B may define that a persistent volume is copied from the first environment 155A to the second environment 155B. Alternatively, the policy 456B may define that a persistent volume is created from scratch in the second environment 155B. The policy 456B may define that a persistent volume is maintained in the second environment 155B.

A system administrator may input a move request to the processor 130A via a user interface 415 (block 416). In an alternative example, the processor 130A may receive a move request responsive to the completion of a task in the first environment 155A or as a result of a specific time the application 460 has been in the first environment 155A.

The processor 130A may detect a configuration data set 465 of the application 460 (block 424). The configuration data set 465 may include various pieces of configuration data. The configuration data may include persistent volume definitions, secret credentials, environment variables, resource limits, minimum system requirements, replica counts, deployment hooks, and test case definitions.

The processor 130A may determine an action to implement on each piece of configuration data in the configuration data set 465 (block 440) based on the configuration data set 465, the first policy 456A and the second policy 456B. The actions to be implemented on each piece of configuration data in the configuration dataset 465 may include copying the configuration data, generating the configuration data or regenerating the configuration data. For example, the second policy 456B may be that the configuration data needs to be regenerated in the second environment 155C.

The processor 130A may move the application 460 from the first environment 155A to the second environment 155C and implement the decided upon actions on the configuration data of the configuration data set 456 (block 450). The actions may be implemented on the configuration data set 465 while the application 460 is in the first environment 155A. The actions may be implemented on the configuration data set 465 after the application 460 has been moved to the second environment 155C. The actions may be implemented on the configuration data set 465 after the application 460 has been moved from the first environment 155A but before the application 460 has been moved into the second environment 155C. The application 460 may be copied or moved to the second environment 155C.

Figure 5:
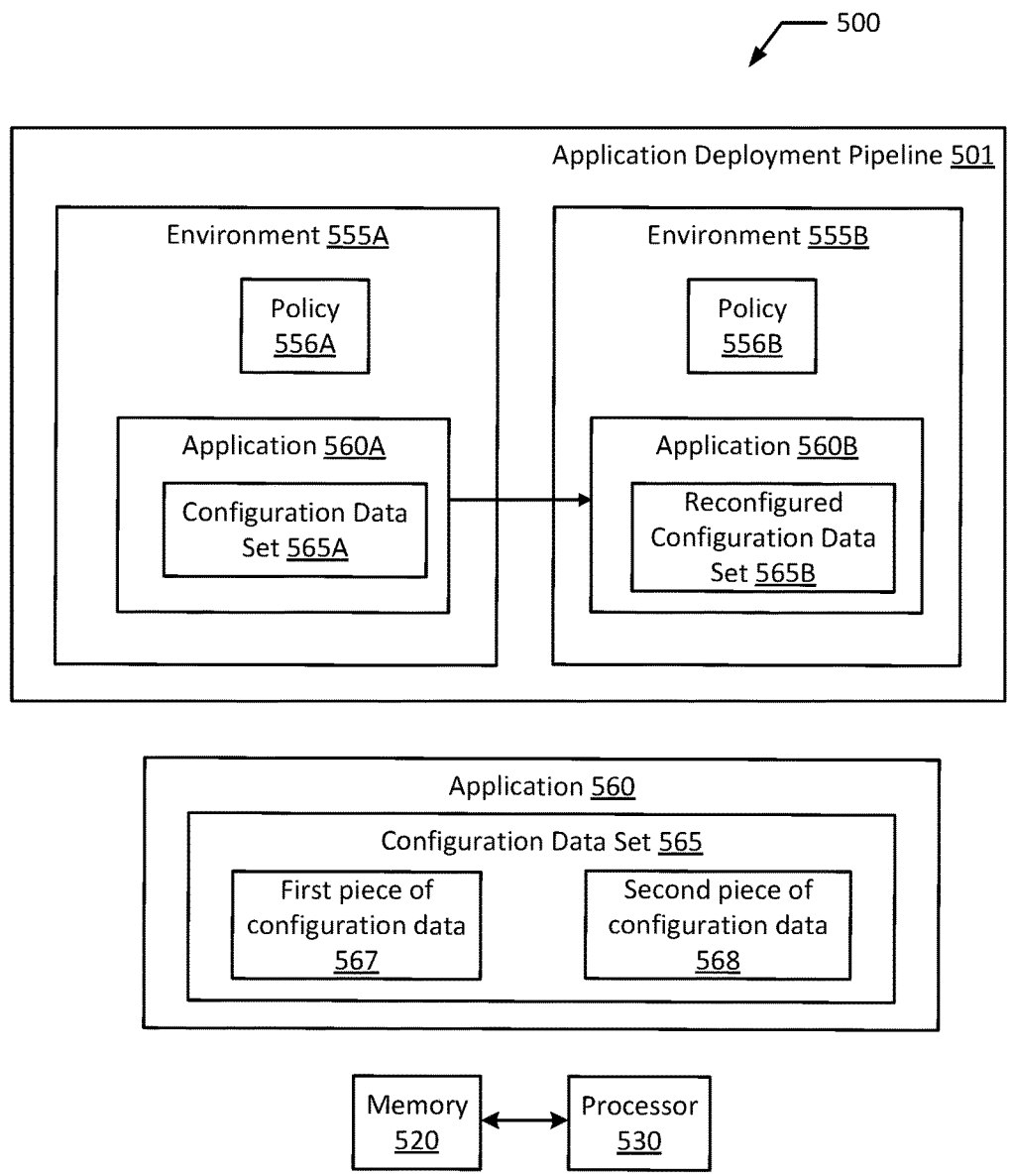
FIG. 5 is a block diagram of an application deployment pipeline system according to an example of the present disclosure.

FIG. 5 illustrates a block diagram of an application deployment pipeline system 501 according to an example of the present disclosure. An example system 500 may include a memory 520, a processor 530, and an application 560. The processor 530 may detect a first policy 556A associated with a first environment 555A. The processor 530 may further detect a second policy 556B associated with a second environment 555B. The processor 530 may receive a request to move the application 560A from the first environment 555A to the second environment 555B. Configuration data of the first environment 555A is incompatible with configuration data of the second environment 555B. The processor 530 may detect a configuration data set 565 associated with the application 560. The configuration data set 565 may include a first piece of configuration data 567 and a second piece of configuration data 568. Based on the first policy 556A, the second policy 556B, and the configuration data set 565, the processor 530 may determine actions to be implemented in the configuration data set 565. The actions to be implemented in the configuration data set 565 may include copying, regenerating, and generating respective pieces of configuration data. The actions may include a first action associated with the first piece of configuration data 567 and a second action associated with the second piece of configuration data 568. The processor 530 may implement the first action on the first piece of configuration data 567 and the second action on the second piece of configuration data 568 to obtain a reconfigured configuration data set 565B that includes different configuration data than the configuration data 565A of the first environment 555A. The processor may move the application 560B, including the reconfigured configuration data set 565B, to the second environment 555B.

It should be understood that various changes and modifications to the examples described herein will be apparent to those skilled in the art. Such changes and modifications can be made without departing from the spirit and scope of the present subject matter and without diminishing its intended advantages. It is therefore intended that such changes and modifications be covered by the appended claims.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

The invention claimed is:

1. A method for managing an application deployment process comprising:
automatically detecting, by an application deployment pipeline, a first policy associated with a first environment;
automatically detecting, by the application deployment pipeline, a second policy associated with a second environment, the second environment executing while the first environment is executing;
receiving, by the application deployment pipeline, a request to move an application from the first environment to the second environment, wherein configuration data of the first environment is incompatible with configuration data of the second environment;
automatically detecting, by the application deployment pipeline, a configuration data set associated with the application, wherein the configuration data set includes a first piece of configuration data and a second piece of configuration data, wherein the first piece of configuration data is a first deployment hook of the application, and the second piece of configuration data is a second deployment hook of the application, wherein the first deployment hook and the second deployment hook are different;
based on the first policy, the second policy, and the configuration data set, determining actions to be implemented in the configuration data set including a first action associated with the first piece of configuration data and a second action associated with the second piece of configuration data;
implementing the first action on the first piece of configuration data and the second action on the second piece of configuration data to obtain a reconfigured configuration data set that includes different configuration data than the configuration data of the first environment without manually configuring the configuration data set; and
moving the application, including the reconfigured configuration data set, to the second environment, wherein the actions to be implemented in the configuration data set include copying, regenerating, and generating respective pieces of configuration data, wherein the first environment is a test environment and the second environment is a stage environment.

2. The method of claim 1, wherein the first piece of configuration data and the second piece of configuration data are regenerated to obtain the reconfigured configuration data set.

3. The method of claim 1 further comprising:
automatically detecting, by the application deployment pipeline, a third policy associated with the second environment;
automatically detecting, by the application deployment pipeline, a fourth policy associated with a third environment, the third environment executing while the second environment is executing;
based on the third policy, the fourth policy, and the configuration data set, determining actions to be taken in the configuration data set including a third action associated with the first piece of configuration data and a fourth action associated with the second piece of configuration data;
implementing the third action on the first piece of configuration data and the fourth action on the second piece of configuration data to obtain a second reconfigured configuration data set that includes different configuration data than the configuration data of the first environment and different configuration data than the configuration data of the second environment without manually configuring the configuration data set; and
moving the application, including the second reconfigured data set, to the third environment, wherein the third environment is a production environment.

4. The method of claim 1, wherein the first piece of configuration data further comprises configuration data selected from at least one of persistent volume definitions, secret credentials, environment variables, resource limits, minimum system requirements, replica counts, and test case definitions.

5. The method of claim 1, wherein the first environment receives the application from a development environment.

6. The method of claim 1, wherein detecting the first policy associated the first environment is initiated by a trigger event.

7. The method of claim 1, wherein the request to move an application from the first environment to the second environment is received from an administrator by the application deployment pipeline.

8. A system for managing an application deployment process comprising:
a memory;
a processor; and
an application,
wherein the processor causes an application deployment pipeline to:
automatically detect a first policy associated with a first environment, wherein the first environment is a test environment;
automatically detect a second policy associated with a second environment, the second environment executing while the first environment is executing, wherein the second environment is a stage environment;
receive a request to move an application from the first environment to the second environment, wherein configuration data of the first environment is incompatible with configuration data of the second environment;
automatically detect a configuration data set associated with the application, wherein the configuration data set includes a first piece of configuration data and a second piece of configuration data wherein the first piece of configuration data is a first deployment hook of the application, and the second piece of configuration data is a second deployment hook of the application, wherein the first deployment hook and the second deployment hook are different;
based on the first policy, the second policy, and the configuration data set, determine actions to be implemented in the configuration data set including a first action associated with the first piece of configuration data and a second action associated with the second piece of configuration data;
implement the first action on the first piece of configuration data and the second action on the second piece of configuration data to obtain a reconfigured configuration data set that includes different configuration data than the configuration data of the first environment without manually configuring the configuration data set; and
move the application, including the reconfigured configuration data set, to the second environment,
wherein the actions to be implemented in the configuration data set include copying, regenerating, and generating respective pieces of configuration data.

9. The system of claim 8, further comprising a cluster including the first environment and the second environment, wherein the first piece of configuration data and the second piece of configuration data are regenerated to obtain the reconfigured configuration data set.

10. The system of claim 8, further comprising a cluster including the first environment and the second environment, wherein the processor moves the application from the second environment in the cluster to the first environment in the cluster.

11. The system of claim 8, wherein the first piece of configuration data further comprises configuration data selected from at least one of persistent volume definitions, secret credentials, environment variables, resource limits, minimum system requirements, replica counts, and test case definitions.

12. The system of claim 8, wherein the first environment receives the application from a development environment.

13. The system of claim 8, further comprising a plurality of containers, wherein the application includes a plurality of application components and each of the plurality of application components is located within a separate container of the plurality of containers.

14. The system of claim 8, further comprising a first cluster and a second cluster, wherein the first environment is located within the first cluster and the second environment is located within the second cluster.

15. A non-transitory computer readable medium storing instructions, which when executed, cause a processor to cause an application deployment pipeline to:
automatically detect a first policy associated with a first environment;
automatically detect a second policy associated with a second environment, the second environment executing while the first environment is executing;
receive a request to move an application from the first environment to the second environment, wherein configuration data of the first environment is incompatible with configuration data of the second environment;
automatically detect a configuration data set associated with the application, wherein the configuration data set includes a first piece of configuration data and a second piece of configuration data wherein the first piece of configuration data is a first deployment hook of the application, and the second piece of configuration data is a second deployment hook of the application, wherein the first deployment hook and the second deployment hook are different;
based on the first policy, the second policy, and the configuration data set, determine actions to be implemented in the configuration data set including a first action associated with the first piece of configuration data and a second action associated with the second piece of configuration data;
implement the first action on the first piece of configuration data and the second action on the second piece of configuration data to obtain a reconfigured configuration data set that includes different configuration data than the configuration data of the first environment without manually configuring the configuration data set; and
move the application, including the reconfigured configuration data set, to the second environment, wherein the first environment is a test environment and the second environment is a stage environment,
wherein the actions to be implemented in the configuration data set include copying, regenerating, and generating respective pieces of configuration data.

16. The computer readable medium of claim 15, wherein the first piece of configuration data and the second piece of configuration data are regenerated to obtain the reconfigured configuration data set.

17. The computer readable medium of claim 15, wherein the first piece of configuration data further comprises configuration data selected from at least one of persistent volume definitions, secret credentials, environment variables, resource limits, minimum system requirements, replica counts, and test case definitions.

18. The computer readable medium of claim 15, wherein the first environment is located within a first cluster and the second environment is located within a second cluster.

19. The computer readable medium of claim 15, wherein the detection of the first policy associated with the first environment is initiated by a trigger event.

20. The computer readable medium of claim 15, wherein the first environment receives the application from a development environment, a test environment, a stage environment, a production environment, and a debug environment.

* * * * *